P. H. JOHNSTON.
MOUNTING FOR SPECTACLES, EYEGLASSES, AND THE LIKE.
APPLICATION FILED FEB. 11, 1916.
1,207,924.
Patented Dec. 12, 1916.
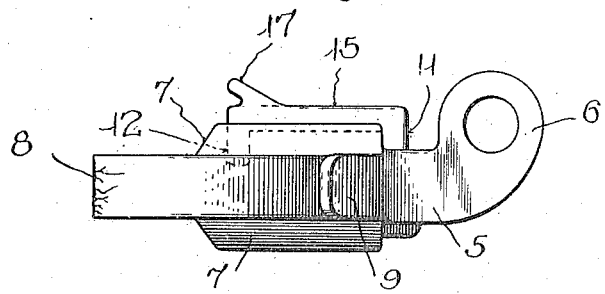
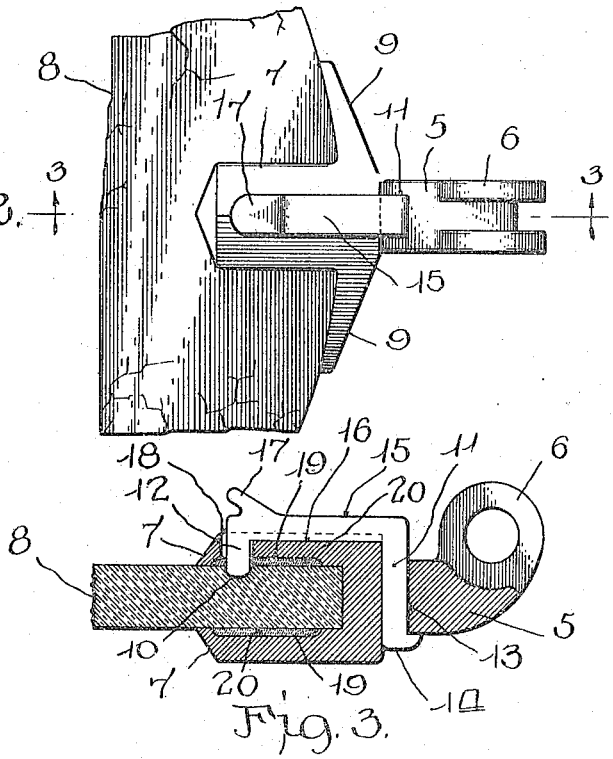
Inventor:
Paul H. Johnston.
Witness:

ately corresponds to the contour of the lens adjacent thereto. [—incomplete, continuing—]

UNITED STATES PATENT OFFICE.

PAUL H. JOHNSTON, OF DAVENPORT, IOWA.

MOUNTING FOR SPECTACLES, EYEGLASSES, AND THE LIKE.

1,207,924.     Specification of Letters Patent.     Patented Dec. 12, 1916.

Application filed February 11, 1916. Serial No. 77,584.

*To all whom it may concern:*

Be it known that I, PAUL H. JOHNSTON, a citizen of the United States, and a resident of Davenport, in the county of Scott and State of Iowa, have invented certain new and useful Improvements in Mountings for Spectacles, Eyeglasses, and the like, of which the following is a full, clear, and exact specification.

My present invention has reference to mountings for spectacles, eyeglasses, and similar devices, and specifically stated, my invention relates to the particular means for attaching and securing the lenses of the spectacles or eyeglasses to the nose-pieces or bridges, and the temples or bows of said devices.

Many methods have heretofore been employed by the manufacturers and jobbers of optical goods to provide an effective means for securing the mountings to the lenses. Many of these have been found ineffective for the reason that the stud-boxes and lenses work loose thus causing annoyance to the wearer or user, and other methods have proven expensive for the reason that they contemplate the boring of an opening or hole entirely through the lenses which unavoidably weakens the lenses and not infrequently causes the breakage or chipping of the adjacent portions of the glass on account of the brittle character of the lenses. These methods are also objectionable for the reason that a mechanic in assembling the mounting with the lenses consumes considerable time in adjusting and turning down the very small screw usually employed to complete the attachment, and it is often the case that when too much pressure is made in clamping the ears or lugs of the stud-box to the lenses the latter will chip or break causing further delay and additional expense to the manufacturer. There has also been put upon the market a class of mountings with which the lenses have been secured by means of cement. The percentage of dependable cemented mountings is not satisfactory owing to the loosening of the cement through the contraction and expansion of the mountings through changes of temperature, and through the breaking of the cement loose from the lenses or mountings when they are jarred either in use or through action.

One of the objects of my invention is the provision of a stud-box or mounting that may be quickly assembled with the lenses without the use of screws or bolts.

Another object is the provision of a mounting that does not require the boring or altering of the lenses.

One of the material objects of my invention is to provide a structure having sufficient flexibility to take care of the expansion and contraction of the parts and also such jars as they might be subjected to short of the destruction of the lenses.

Other objects of my invention are the provision of a mounting for spectacles, eyeglasses and similar articles that is simple in construction, effective in its operation, easy to manipulate and assemble, and which is comparatively inexpensive to manufacture, so that it will not add to the cost of the articles to the consumer.

I prefer to accomplish the various objects of my invention by the means and in the manner hereinafter fully described, and as more particularly pointed out in the claims, reference being had to the accompanying drawing forming a part of this specification, wherein similar reference characters are employed to designate the same parts throughout the figures.

In the drawings: Figure 1 is a longitudinal edge view of the preferred form of my improved mounting for spectacles, eyeglasses, and similar articles, the same being drawn to an enlarged scale for the purpose of clearness and only a fragmentary portion of the lens being illustrated. Fig. 2 is a plan of the fragment shown in Fig. 1. Fig. 3 is a longitudinal section taken on line 3—3, Fig. 2, looking in the direction indicated by the arrows.

Referring to the drawings, it will be observed that the stud 5, projecting from the temple-hinge 6, (or from the bridge or nose-piece as the case may be) is provided at its end adjacent the lens with a pair of laterally-disposed ears 7. These ears extend from the stud in planes that are parallel to each other and they are spaced apart a distance sufficient to accommodate the usual lens 8, that is fitted between the same. Suitable lateral oppositely disposed straps 9 project at substantially right-angles to these ears 7 in opposite directions from the stud and the faces of these straps 9 adjacent to and facing the lens are preferably crescent or segmental-shaped so as to substantially conform with the curvature of the edge of the lens they are adapted to fit. These straps may be of any convenient shape, and the ears are substantially triangular in shape in cross-section and are preferably tapered or pointed at their outer ends.

In order to secure the lens 8 in the box-like structure formed by these ears and straps I prefer to place a shallow indentation or depression 10 in one of the surfaces of the lens adjacent the edge thereof, the said indentation 10 being so positioned with relation to the edge of the lens that it is adapted to receive and seat the end of a suitable flexible spring latch disposed upon the lens-box. This latch preferably comprises a strip of spring metal bent substantially U-shape in outline, one of the arms 11 whereof is longer than its opposite arm 12 and is preferably inserted through a hole bored in the stud 5 where its end is swaged or turned over to provide a retaining head 14. The transverse connecting member 15 of the latch is seated and rests in a longitudinal groove 16 formed in the upper surface of the adjacent ear 7 and at its end adjacent the shorter arm 12 is provided with an outwardly disposed oblique lug 17 that is adapted to be engaged by a suitable tool whereby the latch may be raised to release the same. The short arm 12 of the latch which is preferably disposed in a plane with the long arm 11 is so positioned that it is adapted to extend through a hole 18 bored in the outer end of the adjacent ear 7 and has its free end extended beyond the inner plane of the inner surface of said ear so that it will engage the indentation or depression 10 made in the surface of the lens.

In the drawings, Fig. 3, I have shown the under or facing surfaces of the ears 7 hollowed out slightly to provide recesses 19, 19, that are coated or filled with a suitable adhesive material 20 for the purpose of assistting in securing the box to the lens against lateral movement as well as locking the latch in position after said material has set. The manner of assembly is comparatively simple and is preferably accomplished by inserting the lens between the ears 7 and permitting the member 12 of the latch to snap into position in the indentation or depression 10 in the surface of the lens.

While I have herein shown and described a specific instrumentality for carrying out my invention, it of course will be obvious to others skilled in the art to which my invention appertains that divers modifications or refinements thereof are possible without materially departing from the spirit thereof. I therefore desire it understood that all such changes or alterations are contemplated within the scope of my invention as expressed in the appended claims.

What I claim is:

1. A spectacle or eyeglass mounting comprising a lens, a box provided with a member extended upon one face of said lens, and a separate integral spring member carried by said box and adapted to engage the face of said lens directly opposite said first-mentioned member.

2. A spectacle or eyeglass mounting comprising a lens having a depression thereon adjacent one edge, a box provided with a member extended upon one face of said lens, and a separate one piece spring member carried by said box and adapted to engage the face of said lens directly opposite said first-mentioned member and seat in said depression.

3. A spectacle or eyeglass mounting comprising a lens, a box provided with members extended upon each side of said lens and opposite each other, and a separate one piece spring member carried by said mounting and adapted to engage the lens through one of said members and directly opposite the other of said members and lock the same in said box.

4. A spectacle or eyeglass mounting comprising a lens, a box provided with members extended upon each side of said lens, and a latch adapted to lock said lens in said box and consisting of an elastic body portion disposed upon one of said box members and a lateral extension adapted to extend through the box member upon which it is disposed and contact said lens.

5. A spectacle or eyeglass mounting comprising a lens, a box provided with members extended upon each side of said lens, and a latch adapted to lock said lens in said box and consisting of a substantially U-shaped body of spring metal one of the parallel arms whereof is secured to said box and the remaining portion whereof is adapted to extend along one of said box members and have the opposite arm inserted through said box member and engage said lens.

Signed at Chicago, county of Cook and State of Illinois, this 24th day of January 1916.

PAUL H. JOHNSTON.

Witnesses:
E. K. LUNDY, Jr.,
WM. HAROLD EICHELMAN.